United States Patent [19]
Dean

[11] Patent Number: 5,997,600
[45] Date of Patent: Dec. 7, 1999

[54] FERTILIZER COMPOSITIONS INCLUDING CHELATED METAL IONS

[75] Inventor: Frank W. Dean, Spring, Tex.

[73] Assignee: Stoller Enterprises, Inc., Houston, Tex.

[21] Appl. No.: 08/970,068

[22] Filed: Nov. 13, 1997

Related U.S. Application Data

[60] Provisional application No. 60/030,168, Nov. 13, 1996.

[51] Int. Cl.$^6$ .............................. C05C 11/00; C05C 13/00
[52] U.S. Cl. .............................. 71/27; 71/64.1; 71/DIG. 2
[58] Field of Search ................................... 71/DIG. 2, 27, 71/64.1

[56] References Cited

U.S. PATENT DOCUMENTS

| | | | |
|---|---|---|---|
| 2,770,538 | 11/1956 | Vierling | 71/DIG. 2 |
| 2,813,014 | 11/1957 | Allison et al. | 71/11 |
| 3,533,774 | 10/1970 | Nault | 71/1 |
| 3,960,536 | 6/1976 | Dumont et al. | 71/DIG. 2 |
| 4,265,653 | 5/1981 | Hoyt et al. | 71/11 |
| 5,174,805 | 12/1992 | Masuda | 71/DIG. 2 |
| 5,372,626 | 12/1994 | Zivion et al. | 71/DIG. 2 |
| 5,504,055 | 4/1996 | Hsu | 71/DIG. 2 |

FOREIGN PATENT DOCUMENTS

| | | | |
|---|---|---|---|
| 143365 | 8/1980 | Germany | 71/DIG. 2 |
| 45053 | 4/1976 | Japan | 71/DIG. 2 |

*Primary Examiner*—Wayne Langel
*Attorney, Agent, or Firm*—Browning Bushman

[57] ABSTRACT

The present invention is directed to fertilizer additives and compositions, and to methods for their preparation and administration to plants. The fertilizer additives include chelated metal ions of the transition and alkaline earth metals. The chelated metal solutions are prepared by complexing metal cations using an organic acid and an organic amine. The fertilizer additives include a sufficient quantity of amine to maintain the pH above about 7.5 and preferably about 8–11. While the source of the metal ions may be any biologically acceptable metal salt, the metal oxides are preferred. The preferred chelating agents are citric acid and a difunctional amine. The preferred amines are 2-hydroxyethylamine, dimethylaminopropylamine and mixtures thereof. Additive solutions containing such chelated metals are stable at alkaline pH and are used to prepared clear, liquid fertilizer compositions for delivery of trace metals to plants.

21 Claims, No Drawings

FERTILIZER COMPOSITIONS INCLUDING CHELATED METAL IONS

This application claims benefit of provisional application No. 60/030,168 filed Nov. 13, 1996.

BACKGROUND OF THE INVENTION

I. Field of the Invention

The present invention generally relates to fertilizer additives and fertilizer compositions and to methods for their preparation and use. More specifically, the present invention is directed to fertilizer additives and compositions including chelated metal ions to provide micronutrients necessary for plant growth.

II. Description of the Background

Agriculturally, metal ions are essential nutrients for plant growth. Soil deficiency because of the unavailability or exhaustion of metal ions is very often the cause of poor plant growth. Crop deficiencies occur at extremely low levels of metal deficiency, i.e., at levels of parts/million in the plant tissue. Both soil and foliar application of chelated metal ions may prevent, correct or minimize crop deficiencies. Chelated complexes have been favored because the chelated metal ions remain soluble in different or changing environments. See Chen and Barak, *Advances in Agronomy*, vol. 35, pp. 217–239 (1982). Conventional products have used synthetic chelates. However, even though widely accepted as the best method for the administration of metal ions, synthetic chelates are expensive to produce. See, Barak and Chen, *Soil Sci. Soc. Am. J.*, vol. 51, pp. 893–896 (1987). Accordingly, conventional chelated metal additives have been expensive. Therefore, less expensive, yet still efficient, chelating systems have been sought.

The use of citric acid as a chelating agent to provide an inexpensive, naturally occurring alternative has been proposed. However, it was shown that metal chelates of citric acid were unstable at a pH above 7. See, Cline, et al, *Soil Sci. Soc. Am. J.*, vol. 46, pp. 1158–1164 (1982) and U.S. Pat. No. 5,372,626.

Prior methods for the chelation of metal ions for agricultural use also proposed the introduction of inorganic anions to stabilize the pH. However, these anions may have been associated with ecological damage and their addition adds to the expense of the fertilizer.

Accordingly, there has been a long felt, but unfulfilled need for more efficient, more economical and more environmental friendly fertilizer additives and compositions to deliver micronutrient levels of trace metals to plants and for methods of producing such fertilizers with the required metal nutrients necessary for plant growth. The present invention solves those needs.

SUMMARY OF THE INVENTION

The present invention is directed to novel fertilizer additives and compositions useful for delivering trace levels of metal ions to plant tissue in chelated forms at a neutral pH. These additives and compositions are prepared using a novel combination of chelating agents to complex the metal ions and to control the pH of the additive solution.

While the metals may be provided by any salt, the metal oxides are the preferred source of metals. The methods of the present invention for the conversion of metal salts, preferably oxides, to chelated metal solutions are unique in that they can produce compositions free of the inorganic anions frequently associated with chelation systems. While not limiting the scope of the present invention in as much as the present method will also chelate the metal ions of chloride, sulfate, nitrate, hydroxide and carbonate and other biologically compatible salts of the cations, these salts are more expensive per unit of metal cation, commonly less pure, and have been associated with ecological damage.

Metal oxides are preferred because they are significantly less expensive per unit of metal cation, are usually more pure, and are less toxic to the environment than their inorganic anion counterparts. The metal ions are chelated using an organic acid and organic amine. In the preferred compositions of the present invention metal cations are complexed using citric acid and a sufficient quantity of a difunctional amine to maintain the pH above about 7.5. The difunctional amine offers several advantages over the existing technologies, e.g., odorless formulations, the capability of the formulator to regulate the buffering of solutions with a basic pH, and better environmental safety. The difunctional amine, not only neutralizes the excess acid in solution, but also participates in the formation of the chelated complex via hydrogen bonding to create a more stable complex.

It is a general aspect of the present invention to provide a formulation for a clear, liquid fertilizer additive, comprising water, an organic acid, preferably selected from the carboxylic acids having form about 2 to about 20 carbon atoms, at least one metal salt wherein the metal is preferably selected from the group consisting of the alkaline earth and transition metals, and an organic amine preferably having from about 1 to about 20 carbon atoms. The organic amine is more preferably selected from the group of difunctional amines consisting of organic diamines, hydroxyamines, polyamines, polyhydroxyamines and mixtures thereof. In the presently most preferred embodiments, the present invention provides compositions and methods for chelating metal ions from their metal oxides wherein the metal is selected from the group consisting of calcium, magnesium, iron, cobalt, copper, zinc, molybdenum and mixtures thereof, using citric acid and a difunctional amine selected from the group consisting of 2-hydroxyethlyamine, dimethylaminopropylamine and mixtures thereof. The amine is preferably present in a quantity sufficient to maintain the pH of the additive above about 7.5, preferably from about 8–11. Such fertilizer additive solutions may be generally referred to hereinafter at times as "fertilizer additives" or "additive solutions".

It is another aspect of the present invention to provide a clear liquid fertilizer composition comprised of the foregoing fertilizer additive solutions blended with a liquid fertilizer. Any conventional liquid fertilizer may be used. Typically liquid fertilizers include the N—P—K fertilizers selected from the group containing at least one nutrient selected from the group consisting of nitrogen, phosphorus and potassium. In the present invention fertilizer compositions are preferably formulated so that the concentration of the metal from the additive solution is about 0.001 to about 5.0 percent-by-weight in the final fertilizer composition. The final fertilizer compositions will typically have a neutral or slightly basic pH.

It is another aspect of the present invention to provide a method for formulating clear liquid fertilizer compositions comprising fertilizer additives containing complexed metal cations. The preparation involves complexing metal cations in an acidic solution of water and an organic acid, preferably citric acid. The preferred metal source for the ions is the metal oxides. The solution of complexed metal ions is stabilized and buffered by addition of a sufficient quantity of an organic amine to maintain the pH above about 7.5, more preferably from about 8–11. The preferred organic amines are difunctional amines selected from the group consisting of diamine, hydroxyamine, polyamine, polyhydroxy amine and mixtures thereof. The most preferred amines are 2-hydroxyethylamine, dimethylaminopropylamine and mixtures thereof.

The pH adjusted additive solutions are then blended with liquid fertilizer solutions which contain one of the essential nutrients, i.e., nitrogen, phosphorous, or potassium. Preferred weight ratios for preparing the liquid fertilizer compositions are about 1 part additive solution to about 1–10 parts fertilizer solution. These compositions are preferably formulated to provide to about 5.0 percent-by-weight metal in the fertilizer composition at a generally neutral pH.

DETAILED DESCRIPTION OF THE PREFERRED EMBODIMENT

The present invention provides an improved and more economical fertilizer composition for delivering trace levels of metal ions to plant tissues. The compositions and methods of the present invention provide chelated metal ions in an aqueous fertilizer additive. Chelation is achieved using an organic acid and an organic amine.

The organic acid may be a carboxylic acid, preferably a carboxylic acid having 2–20 carbons. Citric acid has been found to be the presently most preferred organic acid primarily due to its low cost and abundant availability, thereby relieving the high cost associated with prior synthetic chelates. Citric acid is also preferred due to environmental and other considerations, e.g., odor.

The preferred organic amines have from about 1 to about 20 carbon atoms. The more preferred organic amines are the difunctional amines selected from the group consisting of organic diamines, hydroxamines, polyamines, polyhydroxyamines and mixtures thereof. The most preferred organic amines are the difunctional amines selected from the group consisting of 2-hydroxyethylamine, dimethylaminopropylamine and mixtures thereof. The organic amine, preferably the difunctional amine, should be present in the fertilizer additive in an amount sufficient to maintain the pH of the additive solution above about 7.5, preferably at a pH from about 8–11.

Broadly, the metal ions in the fertilizer additive may be the biologically required trace metals. The metal ions in the additive solution are typically selected from the group consisting of the alkaline earth and transition metals. The preferred compositions include at least one metal selected from the group consisting of calcium, magnesium, manganese, iron, cobalt, copper, zinc, molybdenum and mixtures thereof. While the metal ions may be provided by any salt soluble in the acid/amine aqueous solution, the preferred source of metal ions is the metal oxides. While the metal may be present in any quantity, it is preferred that the fertilizer additive solution contain about 0.1 to about 15.0 percent-by-weight of metal ions.

In the present invention the fertilizer additive solutions are blended with conventional, liquid fertilizers to produce clear, liquid fertilizer compositions. The liquid fertilizers are chosen from the group of fertilizers containing at least one nutrient selected from the group consisting of nitrogen, phosphorus and potassium. These liquid fertilizers are commonly referred to as "N—P—K fertilizers". A sufficient amount of the additive solution is blended with the selected liquid fertilizer so that the concentration of the complexed metal supplied by the additive solution is about 0.001 to about 5.0 percent-by-weight in the final fertilizer composition. This blending is typically achieved when the weight ratio of fertilizer additive to liquid fertilizer is about 1 part additive to about 1–10 parts liquid fertilizer.

Fertilizer additives and compositions in accord with the present invention may be prepared by the following method. An acidic solution is prepared by adding an organic acid to water. The preferred organic acids are selected from the group of carboxylic acids having from about 2–20 carbon atoms. The most preferred carboxylic acid is citric acid. A metal salt, preferably the oxide, selected from the salts of biologically required trace metals, preferably the alkaline earth and transition metals, is dissolved in the acidic solution. The acidic solution containing metal ions is then buffered by adding a sufficient quantity of an organic amine to bring the pH of the solution to at least about 7.5, preferably to about 8–11. The resulting solution of complexed metal ions is typically clear and free of any precipitate. These solutions have been found to be quite stable and to provide excellent liquid fertilizer additives useful to provide trace metals to plant tissue. The liquid fertilizer additive solution is then blended with a conventional, liquid N—P—K fertilizer. The resulting fertilizer composition is also typically a clear, liquid fertilizer solution, preferably containing about 0.001 to about 5.0 percent-by-weight metal and having a neutral pH.

The fertilizer compositions described above and/or prepared in accord with the foregoing procedures may be applied to the ground surrounding a plant or to the foliage of the plant by conventional methods to deliver readily absorbable trace metals to the plant tissue. Thus, the fertilizer additives and compositions of the present invention, particularly when using the metal oxides, provide an economical and environmentally friendly source of trace metals for use in a wide range of agricultural applications.

The forgoing description of the present invention is susceptible of a broad utility and application. It is therefore readily understood by those persons skilled in the art that many embodiments and adaptations of the present invention other that those herein described will be apparent from or reasonably suggested by the present invention and the foregoing description thereof, without departing from the substance or scope of the present invention. With the foregoing description of the present invention, it is believed that any person reasonably skilled in the art will be able to prepare and utilize the chelated metal ion compositions described herein. For purposes of illustration, but without limiting the scope and substance of the present invention, the following examples describe several specific embodiments of fertilizer compositions prepared in accord with this invention.

EXAMPLE 1

A fertilizer additive containing 9% chelated zinc was prepared by adding 1935 grams of 2-hydroxyethylamine to 2000 grams of water. To this solution was added 1256 grams of zinc oxide, followed by 2943 grams of citric acid. The solution was stirred. After allowing the solution to sufficiently cool, 2796 grams of water were added to dilute the solution to 9% zinc. The resulting solution was clear yellow and had a pH of 9. The additive solution was then added to conventional, N—P—K liquid fertilizers to give clear fertilizer compositions.

EXAMPLE 2

A fertilizer additive containing 6% molybdenum (II) was formulated by adding 32 grams of citric acid to 114 grams of water. To this solution was added 14 grams molybdic oxide with stirring. Later, 32 grams of 2-hydroxyethylamine and 4 grams of dimethylaminopropylamine were added to produce a clear, chelated Mo(II) solution having a pH of 7.8. This additive was added to conventional, N—P—K liquid fertilizers to produce a clear fertilizer composition.

EXAMPLE 3

A fertilizer additive containing 5% manganese was prepared by adding 360 grams of citric acid to 1181 grams of water. After the citric acid was dissolved, 128 grams of manganese (II) oxide was added to the mix and allowed to react and form manganese citrate, an insoluble white to very light pink precipitate. After the precipitate formed, 320 grams of 2-hydroxyethylamine and 10 grams of dimethylaminopropylamine were added. The precipitate was dissolved to produce a clear 5% manganese chelated solution having a pH of 10.8. This additive was added to conventional, N—P—K liquid fertilizers to produce clear fertilizer compositions.

EXAMPLE 4

A clear, yellow 3% magnesium fertilizer additive was prepared by dissolving 500 grams of citric acid in 920 grams of water. To this solution was added 100 grams of magnesium oxide with stirring. Then 440 grams of 2-hydroxyethylamine and 40 grams of dimethylaminopropylamine were added. The resulting additive solution was a clear, yellow 3% chelated magnesium solution having a pH of 8. This fertilizer additive was added to conventional, N—P—K liquid fertilizers to produce clear fertilizer compositions.

EXAMPLE 5

A fertilizer additive containing 5% ferrous ion was prepared by dissolving 400 grams of citric acid in 690 grams of water. Then 500 grams of ferrous sulfate was added to the blend. Slowly, 400 grams of 2-hydroxyethylamine and 10 grams of dimethylaminopropylamine were admixed to the blend. A dark green chelated solution of 5% ferrous iron having a pH of 8 was produced. This fertilizer additive was added to conventional, N—P—K liquid fertilizers to produce clear fertilizer compositions.

EXAMPLE 6

A fertilizer additive containing 5% copper was produced by adding 310 grams of citric acid to 1210 grams of water. To this blend was added 190 grams of tribasic copper sulfate. Later, 280 grams of 2-hydroxyethylamine were added slowly to produce a dark blue solution having a pH of 8. This fertilizer additive was added to conventional, N—P—K liquid fertilizers to produce clear fertilizer compositions.

EXAMPLE 7

A 5% chelated cobalt fertilizer additive was prepared by adding 360 grams of citric acid to 840 grams of water. After the citric acid had dissolved, 440 grams of cobalt sulfate were added to the blend. Later, 320 grams of 2-hydroxyethylamine and 40 grams of dimethylaminopropylamine were added to the solution. The resulting solution was a clear, dark purple solution having a pH of 8.7. This fertilizer additive was added to conventional, N—P—K liquid fertilizers to produce clear fertilizer compositions.

EXAMPLE 8

A 5% copper fertilizer additive was produced by adding 156 grams of citric acid to 422 grams of water. To this solution was added 197 grams of copper sulfate heptahydrate. Then 200 grams of 2-hydroxyethylamine were added slowly to produce a dark blue solution having a pH of 7.6. This fertilizer additive was then added to conventional, N—P—K liquid fertilizers to produce clear fertilizer compositions.

EXAMPLE 9

A 12% zinc fertilizer additive was produced by adding 250 grams of citric acid to 300 grams of water. To this blend was added 150 grams of zinc oxide. Next, 300 grams of 2-hydroxyethylamine were added slowly to produce a clear yellow solution having a pH of 9. This fertilizer additive was added to conventional, N—P—K liquid fertilizers to produce clear fertilizer compositions.

EXAMPLE 10

A clear, yellow 3% magnesium fertilizer additive was prepared by dissolving 250 grams of citric acid in 214 grams of water. Afterwards, 286 grams of magnesium sulfate heptahydrate were added slowly to the solution. Then 250 grams of 2-hydroxyethylamine were added. The resulting additive was a clear, yellow 3% chelated magnesium solution having a pH of 8. This fertilizer additive was then added to conventional, N—P—K liquid fertilizers to produce clear fertilizer compositions.

EXAMPLE 11

A clear, dark green fertilizer additive containing 4.5% zinc, 1% manganese, 1% copper and 1% iron was prepared by dissolving 200 grams of citric acid in 464 grams of water. To this solution was added slowly with stirring, 13 grams of manganese oxide, 56.5 grams of zinc oxide, 36 grams of a 13% ferric chloride solution and 28 grams of copper chloride. Then 200 grams of 2-hydroxyethylamine and 20 grams of dimethylaminopropylamine were added. The resulting product was a clear, dark green solution. This fertilizer additive was then added to conventional, N—P—K liquid fertilizers to produce clear fertilizer compositions.

EXAMPLE 12

A chelating solution was prepared by adding 40 grams of citric acid to 120 grams of water. After the acid dissolved, 40 grams of 2-hydroxyethylamine were stirred into the solution. To 100 grams of the chelating solution were admixed 400 grams of a 10% caustic solution. Two grams of a 13% ferric chloride solution and one gram of calcium hydroxide were then added to the solution. This produced a clear, chelated metal solution which may be added to conventional, N—P—K liquid fertilizers to produce clear fertilizer compositions. In an alternative procedure, addition of the ferric chloride, calcium hydroxide and caustic solutions without the chelating solution, resulted in the production of a precipitate in the fertilizer additive. Subsequent addition of the chelating solution containing the organic acid and amine will produce a clear, fertilizer additive.

Compatibility between the additive solution and the liquid fertilizer is essential. If the metal cations are not sufficiently chelated then insoluble salts will form. Tests were performed by blending various liquid fertilizers with chelated additive solutions made using the above methods of the present invention. The chelates in the following table were complexed with citric acid and buffered with 2-hydroxyethylamine. The results of those compatibility tests are set forth in Table I.

TABLE I

| Liquid Fertilizer[1] | Iron (II) | Zinc | Manganese | Mixture | Copper | Molybdenum | Cobalt | Iron (III) |
|---|---|---|---|---|---|---|---|---|
| 11-37-0 | Clear | Clear | Clear | Clear | Clear | Clear | Clear | Clear |
| 4-11-11 | Clear | Clear | Clear | Clear | Clear | Clear | Clear | Clear |
| 32-0-0 | Clear | Clear | Clear | Cloudy | Clear | Clear | Clear | Clear |
| 12-0-0,26S | Clear | Clear | Clear | Clear | Clear | Clear | Clear | Clear |
| DAP | Clear red | Clear | Salt produced | Clear | Clear | Clear | Clear | Clear |

[1]11-37-0 - ammonium polyphosphate
4-11-11 - ammonium polyphosphate, potassium chloride
32-0-0 - ammonium nitrate, urea
12-0-0, 26S - ammonium nitrate, ammonium thiosulphate
DAP - diammoniumphosphate (orthophosphate)

[1]11-37-0—ammonium polyphosphate
4-11-11—ammonium polyphosphate, potassium chloride
32-0-0—ammonium nitrate, urea
12-0-0, 26S—ammonium nitrate, ammonium thiosulphate
DAP—diammoniumphosphate (orthophosphate)

Table I above demonstrates the utility of the fertilizer additives of the present invention as well as their unique ability to produce clear, liquid fertilizer compositions.

The foregoing description of the invention has been directed in primary part to particular preferred embodiments in accordance with the requirements of the Patent Statutes and for purposes of explanation and illustration. It will be apparent, however, to those skilled in the art that many modifications and changes in the specifically described methods may be made without departing from the true scope and spirit of the invention. For example, while citric acid and a difunctional amine are preferred, other organic acids and amines may be used. In fact, soluble salts of the organic acids may be used in place of the acids. Also, while it is preferred to dissolve the metal salt in an aqueous solution of the organic acid to which the amine is then added, the order of additive does not appear to be critical. Therefore, the invention is not restricted to the preferred embodiments described and illustrated but covers all modifications which may fall within the scope of the following claims.

What is claimed is:

1. A liquid fertilizer composition, comprising:
    water;
    citric acid;
    a difunctional amine selected from the group consisting of 2-hydroxyethylamine, dimethylaminopropylamine and mixtures thereof;
    at least one metal oxide wherein said metal is selected from the group consisting of calcium, magnesium, manganese, iron, cobalt, copper, zinc, molybdenum and mixtures thereof; and
    a liquid fertilizer solution including at least one nutrient selected from the group consisting of nitrogen, phosphorus and potassium.

2. The fertilizer composition of claim 1 wherein said metal has been complexed by said citric acid and said difunctional amine.

3. The fertilizer composition of claim 2 wherein said complex was formed in an aqueous solution of said citric acid and a sufficient quantity of said amine to maintain the pH of said solution above about 7.5.

4. The fertilizer composition of claim 3 comprising a mixture of said aqueous solution and said liquid fertilizer solution in a weight ratio of about 1–10 parts liquid fertilizer solution for each part aqueous solution.

5. The fertilizer composition of claim 1 wherein said composition contains about 0.001 to about 5.0 percent-by-weight of said metal.

6. The fertilizer composition of claim 1 having a pH of about 7.0.

7. A liquid fertilizer additive, comprising:
    water;
    an organic acid;
    at least one metal salt wherein said metal is selected from the group consisting of the alkaline earth and transition metals; and
    a sufficient quantity of a difunctional organic amine selected from the group consisting of 2-hydroxyethylamine, dimethylaminopropylamine and mixtures thereof to maintain the pH of said additive above about 7.5.

8. The liquid fertilizer additive of claim 7 wherein said metal salt is a metal oxide.

9. The liquid fertilizer composition of claim 7 wherein said metal is selected from the group consisting of calcium, magnesium, manganese, iron, cobalt, copper, zinc, molybdenum and mixtures thereof.

10. The liquid fertilizer additive of claim 7 wherein said organic acid is selected from the group consisting of carboxylic acids having from about 2 to about 20 carbon atoms.

11. The liquid fertilizer additive of claim 7 wherein said pH is about 8–11.

12. The liquid fertilizer additive of claim 7 wherein said additive contains about 0.1 to about 15.0 percent-by-weight of said metal.

13. The liquid fertilizer additive of claim 7 wherein said metal has been complexed by said organic acid and said organic amine.

14. A liquid fertilizer composition, comprising:
    a liquid fertilizer solution including at least one nutrient selected from the group consisting of nitrogen, phosphorus and potassium; and
    a sufficient quantity of a liquid fertilizer additive comprising an additive defined by claim 7, 8, 9, 10, 11, 12 or 13 so that the concentration of the metal of said additive in said composition is about 0.001 to about 5.0 percent-by-weight.

15. A method for providing metal ions to plants by administering to the soil in which the plants grow or to the foliage of the plant a liquid fertilizer composition comprising a fertilizer composition defined in claim 1, 2, 3, 4, 5 or 6.

16. A method for preparing a liquid fertilizer composition, comprising:
    adding an organic acid to water to form an acidic solution;
    dissolving a metal salt in said acidic solution wherein said metal is selected from the group consisting of the alkaline earth and transition metals and mixtures thereof;

adding to the resulting solution a sufficient quantity of a difunctional organic amine selected from the group consisting of 2-hydoxyethylamine, dimethylaminopropylamine and mixtures thereof to bring the pH of said solution to at least about 7.5; and adding the resulting solution to a liquid fertilizer solution including at least one nutrient selected from the group consisting of nitrogen, phosphorous and potassium to produce said liquid, fertilizer composition.

17. The method of claim 16 wherein said organic acid is citric acid.

18. The method of claim 16 wherein said metal is selected from the group consisting of calcium, magnesium, manganese, iron, cobalt, copper, zinc, molybdenum and mixtures thereof.

19. The method of claim 18 wherein said metal salt is an oxide.

20. The method of claim 18 wherein said metal salt is added in a quantity sufficient so that the concentration of said metal in said liquid fertilizer composition is about 0.001 to about 5.0 percent-by-weight.

21. The method of claim 20 wherein said amine is added in a sufficient quantity to maintain the pH of said liquid fertilizer composition between about 8–11.

* * * * *